(12) United States Patent
Deloatch

(10) Patent No.: US 10,866,622 B1
(45) Date of Patent: Dec. 15, 2020

(54) DEVICE FOR SECURING A CHARGE OPERATION OF AN END-USER DEVICE

(71) Applicant: The Government of the United States as represented by the Director, National Security Agency, Ft. George G. Meade, MD (US)

(72) Inventor: Daryle D. Deloatch, Severn, MD (US)

(73) Assignee: Government of the United States as represented by Director National Security Agency

(*) Notice: Subject to any disclaimer, the term of this patent is extended or adjusted under 35 U.S.C. 154(b) by 219 days.

(21) Appl. No.: 16/216,325

(22) Filed: Dec. 11, 2018

(51) Int. Cl.
*G06F 1/26* (2006.01)
*G08B 21/18* (2006.01)
*G06F 21/60* (2013.01)
*H02J 7/00* (2006.01)

(52) U.S. Cl.
CPC ............ *G06F 1/266* (2013.01); *G06F 21/606* (2013.01); *G08B 21/182* (2013.01); *H02J 7/00* (2013.01); *H02J 7/0047* (2013.01); *H02J 2207/30* (2020.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505
See application file for complete search history.

(56) References Cited

U.S. PATENT DOCUMENTS

| | | | | |
|---|---|---|---|---|
| 8,346,645 | B1* | 1/2013 | Stewart | G06Q 10/0639 705/36 R |
| 9,401,977 | B1 | 7/2016 | Gaw | |
| 10,423,942 | B2* | 9/2019 | Lee | G06Q 20/327 |
| 10,726,698 | B1* | 7/2020 | Jondu | H04W 4/021 |
| 2004/0064728 | A1* | 4/2004 | Scheurich | H04W 12/06 726/9 |
| 2004/0260947 | A1* | 12/2004 | Brady | H04L 63/1425 726/23 |
| 2006/0190653 | A1* | 8/2006 | Wahler | G06F 21/85 710/303 |
| 2015/0106920 | A1* | 4/2015 | Li | H04L 67/1095 726/20 |
| 2015/0326558 | A1* | 11/2015 | Rombouts | H04L 63/10 726/5 |
| 2016/0018865 | A1 | 1/2016 | Higgins et al. | |

* cited by examiner

*Primary Examiner* — Zahid Choudhury

(57) ABSTRACT

A secure charging device provides a charge signal from a host device to an end-user device to charge a battery of the end-user device. The secure charging device includes data transmission logic for transmitting data signals from the host device to the end-user device. The secure charging device also include data monitoring logic for monitoring the data transferred from the host device to the end-user device. Alternatively, the data monitoring logic may include logic for terminating the data transmission signal.

18 Claims, 5 Drawing Sheets

US 10,866,622 B1

DEVICE FOR SECURING A CHARGE OPERATION OF AN END-USER DEVICE

FIELD OF THE INVENTION

This invention is generally directed to a device for securing a charge operation of end-user device.

BACKGROUND OF THE INVENTION

Batteries used to operate end-user/portable electronic devices are often charged via a cable connected to a host electronic device. In order to carry out the charge operation, electrical connection is provided between the host device and the end-user device via a charging cable. The connection between each device and the cable may be provided by a USB connection, Ethernet connection, or fiber optic connection, for example. Charging of an end-user device may also be performed via a wireless connection provided by electromagnetic induction. Each of these connections provides multiple wires for connection of the host and end-user devices. In the case of a wireless connection, channels rather than wires are provided between the host device and the end-user device. The wires/channels provided by the connections include one or more data wire/channels, one or more charge wires/channels, and one or more ground channels/wires. Types of data carried by the data wires/channels include for example, file content, commands, error coding, protocol exchanges, header information, data sync, and other types of data transfers. The charge wires/channels typically can be used to harness voltages that can range (but are not limited to) 0 volts-5 volts. Ground wire/channels carry a persistent 0 volts. During a charge operation, voltage from the charge wires/channels, however, there may also be inadvertent and/or purposeful interactions conducted over the data wires/channels. For example, the initial connection of a host device and an end-user device via a charging cable may involve data initializations (ex. Protocol exchanges, header, etc.) over the data wire/channel to ready a connected end-user device to accept connection to the host device. Because the passage of data during a charge operation could result in an unauthorized data transmission or a malicious data transmission, it is desired to provide the user information about data transfer which occurs during a charge operation or in some instances it is desired to terminate the transfer of data during a charge operation.

SUMMARY OF THE INVENTION

Briefly, the present invention discloses a secure charging device for providing a charge from a host device to the battery of an end-user device. The secure charging device includes data transmission logic for provide a data transmission signal from the host device to the end user device. The secure charging device also includes data monitoring logic to monitor the data transmission signal. Alternatively the data monitoring logic may provide termination of the data transmission signal preventing the transfer of data to the end-user device during a charge operation.

BRIEF DESCRIPTION OF THE DRAWINGS

The organization and manner of the structure and operation of the invention, together with objects and advantages thereof, may best be understood by reference to the following description, taken in connection with the accompanying drawings, wherein like reference numerals identify like elements in which.

DETAILED DESCRIPTION OF THE PREFERRED EMBODIMENT

Figure 1:
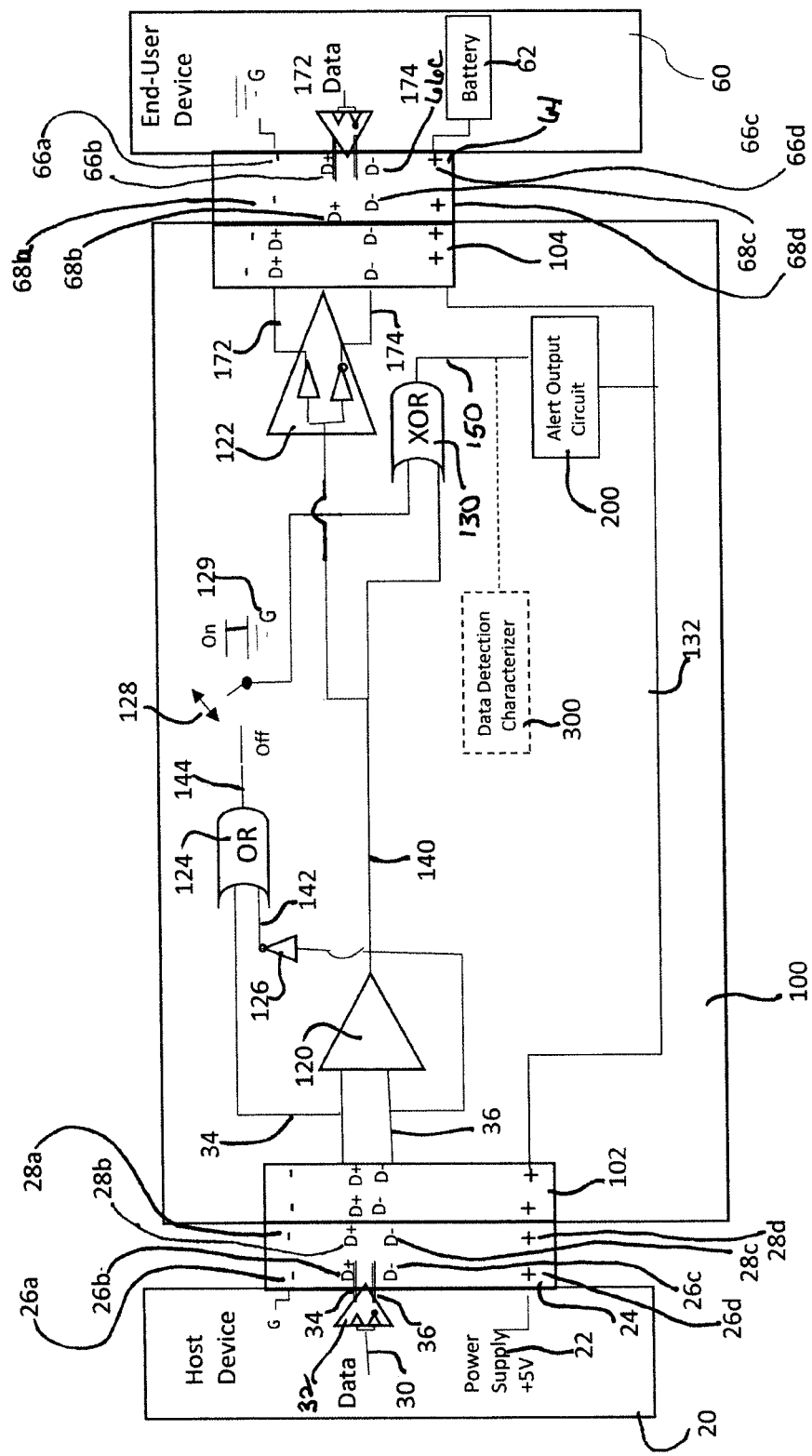
FIG. 1 illustrates a first embodiment of the invention along with a host device and an end-user device.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The invention provides a series of hardware based or software based logic elements, to provide a connection between a host device and an end-user device while monitoring, and/or terminating transmissions over the data channels/wires to ensure a "charge only" state is executed. The invention also provides for the detection of a "no-charge" state. A charge only state provides for the transfer of charge from the host device to the end-user device without a transfer of data. In a no-charge state the battery of the end-user device is not connected to the power supply of the host device, however data may or may not be provided over the data channels/wire. Although hardware-based logic elements are illustrated in the attached drawings, it understood that software may be provided in the host device or the end-user device to provide virtualized versions of the hardware based logic connections.

An embodiment of the secure charging device 100 is illustrated in FIG. 1. As illustrated in FIG. 1, the secure charging device 100 is in communication with a host device 20 and an end-user device 60 during a charge operation. The charge operation is performed for the purpose of charging the battery 62 of the end-user device 60 utilizing the power supply 22 of the host device 20. The host device 20 and the end user device 60 each include a connector 24, 64 respectively for providing connection to the secure charging device 100. The connectors 24, 64 may be provided by a variety of connector types permitting charge and data to be passed from the host device 20 to the end-user device 60. For example, the connectors 24, 64 could be USB connectors, Ethernet connectors, fiber optic connectors, or wireless connectors. In the case of a wireless connection, inductive coils are provided in the host device 20 and the end-user device 60 for communication with inductive coils provided in the secure charging device 100. As illustrated in FIG. 1 connector 24 includes device-side connections 26a-26d and communication-side connections 28a-28d. Likewise, connector 64 includes device-side connections 66a-66d and communication-side connections 68a-68d. The definition of device-side connection is an input/output (I/O) interface that offers external connectivity outlet for the device to interact with another devices or peripherals. A communications-side connection is an input/output (I/O) interface that offers receipt of external connectivity with a device or peripheral. Specifically, each connector 24, 64 provides device-side common ground connectors 26a, 66a; communication-side common ground connectors 28a, 68a; device-side power connectors 26d, 66d; communication-side power connectors 28d, 68d; a pair of device-side differential data connectors 26b, 26c and 66b, 66c; and a pair of communication-side differential data connectors 28b, 28c and 68b, 68c.

As will be described herein, connection between the host device 20 and the end-user device 60 is provided via the secure charging device 100. As illustrated in FIG. 1, the secure charging device 100 includes a host-side connector 102 and an end-user-side connector 104. The host-side connector 102 mates with the connector 24 of the host device 20 and the end-user-side connector 104 mates with the connector 64 of the end-user device 60. Although a direct connection is illustrated between the connector 24 of the host device 20 and the connector 102 of secure charging device 100 and between the connector 64 of end-user device 60 and the connector 104 of the secure charging device 100, it is to be understood that additional cables may be utilized between the connectors 24 and 102 and between the connectors 64 and 104 for conveniently connecting the devices 20, 100 and 64.

The host 20 generates a data input signal 30 which is provided to a data differential transmitter 32 to provide data differential signals (D+) 34 and (D−) 36. Data differential signal D+ is provided to connectors 26b, 28b and data differential signal D− is provided to connectors 26c, 28c.

The secure charging device 100 further includes a subtractor 120, a differential transmitter 122, an OR gate 124, a NOT gate 126, a switch 128, an XOR gate 130, a charge line 132, and an alert output component 200. The secure charging device 100 optionally includes a data detection characterizer 300.

The subtractor 120 and the data differential transmitter 122 together provide data transmission logic. The data transmission logic receives the data differential signals 34, 36 from the host device 20 and transmits data differential signals 172, 174 to the end-user device 60 which correspond to the data differential signals 34, 36 received from the host device 20. More specifically, the subtractor 120 receives positive clone data differential signal (D+) 34 and negative clone data differential signal (D−) 36 via the connectors 102, 24 and converts the data differential signals into a refined data stream having less noise to provide a data transmission signal 140. The data transmission signal 140 is provided to the differential transmitter 122 to generate differential data signals D+ and D− signals 172, 174. Differential data signals 172, 174 correspond to differential data signals 34, 36 and are provided to the end-user device 60 via mated connectors 104, 64.

The OR gate 124, the NOT gate 126, the switch 128 and the XOR gate 130 together provide data monitoring logic for producing a data monitoring signal 150. Specifically, the positive clone signal D+ is fed directly to the OR gate 124 and the negative clone signal D− is fed thru the NOT gate 126 providing an inverted negative clone signal 142 which is fed to the OR gate 124. The OR gate 124 provides OR gate output 144. The OR gate output 144 corresponds to the data input signal 30.

The switch 128 provides for selection of either the corresponding data input signal 144 or a common ground 129 as an input to the XOR gate 130. When the switch is in an OFF position, a first input to the XOR gate 130 is provided by the corresponding data input signal 144 and a second input to the XOR gate is provided by the data transmission signal 140. When the switch is in an ON position, a first input to the XOR gate 130 is provided by the common ground connection 129 and the second input to the XOR gate 130 is provided by the data transmission signal 140. The output of the XOR gate 130 provides the data monitoring signal 150.

The charge line 132 of the secure charging device 100 provides for connection of the power supply 22 of the host device 20 to the battery 62 of the end-user device 60 via the connectors 24, 102, 104, 64. The charge line 132 transfers a charge signal from the power supply 22 of the host device 20 to the battery 62 of the end user-device 60 to charge the battery 62 of the end-user device 60.

The secure charging device 100 provides two modes of operation. With the switch 128 in the OFF position, the secure charging device 100 is in a security disabled mode. With the switch 128 in the ON position the secure charging device 100 is in a security enabled mode.

In the security disabled mode, a charge signal is passed from the host device 20 to the end user device 60 via the charge line 132 and a data transmission signal from the host 20 is passed to the end-user device 60 via the data transmission logic including subtractor 120 and the differential transmitter 122, to provide data differential signals 172, 174. In the security disabled mode, the corresponding data input signal 144 is provided to a first input of the XOR gate 130 and the data transmission signal 140 is provided to the second input of the XOR gate 130. If data input provided by the host 20 is high (5 volts), the inputs 140, 144 to the XOR gate 130 are high and thus the output of the XOR gate/data monitoring signal 150 will be low (0 volts). Thus, no data monitoring signal 150 is provided by the XOR gate 130 in the security disabled mode.

In the security enabled mode, charge is passed from the host device 20 to the end user device 60 via the charge line 132 and data from the host 120 is passed to the end-user device 60 via data transmission logic including subtractor 120 and differential transmitter 122. Thus, the passing of charge and data from host device 20 to end-user device 60 functions similarly in both the security disabled and security enabled modes of operation. In the security enabled mode of operation, the common ground connection 129 provides the first input to the XOR gate 130 and the data transmission signal 140 provides the second input of the XOR gate 130. In this security enabled mode, if data input provided by the host 20 is high (5 volts), the inputs to the XOR gate 130 are common ground (0 volts) provided by the switch 128 and high (5 volts) provided by the data transmission signal 140. Thus the output of the XOR gate/data monitoring signal 150 will be high (5 volts). In this security enabled mode, if data input provided by the host 20 is low (0 volts), the inputs to the XOR gate 130 are common ground (0 volts) provided by the switch 128 and low (0 volts) provided by the data transmission signal 140. As a result, the output of the XOR gate/data monitoring signal 150 will be low (0 volts). Thus, the output of the XOR gate/data monitoring signal 150 reflects the data input signal 30 from the host device 20.

Figure 2:
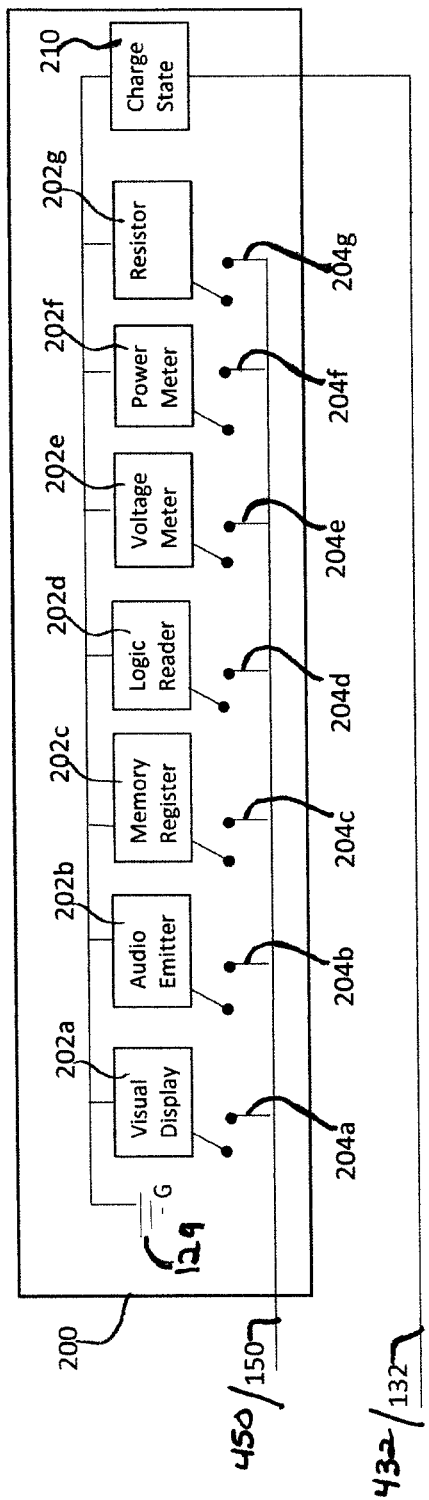
FIG. 2 illustrates an alert output component of the invention.

The alert output component 200 is illustrated in greater detail in FIG. 2. The alert output component 200 is provided between the XOR output 150 and the charge line 132. When the alert output component 200 receives the data monitoring signal 150 an alert is provided to the observer that the passage of data is occurring between the host device 20 and the end-user device 60. Thus, the data monitoring signal 150 provides information about the data input signal 30 of the host device 20 which is passed to the end-user device 60 via the data transmission logic.

The alert output component 200 consists of seven subcomponents 202a-202g along with seven subcomponent switches 204a-204g offering various alerting methods including a visual display 202a, an audio emitter 202b, a memory register 202c, a logic reader 202d, a voltage reader 202e, a power meter 202f, and a resistor 202g. The alert output component 200 may include any number and any combination of the subcomponents 202a-202g desired. Each subcomponent 202a-202g is connected to common ground 129. Power is provided to each subcomponent 202 via the charge line 132. When switch 128 is closed, power may also be provided to the subcomponent 202 via line 150. The data monitoring signal 150 is provided to each subcomponent 202a-202g via the associated subcomponent switch 204a-204g. The alert output component 200 further includes a charge state indicator 210. The charge state indicator 210 indicates the presence or absence of power on the charge line 132. The charge state indicator 210 is provided by a visual indicator, such as for example, an LED. The charge state indicator 210 connected between the charge line 132 and common ground. When power is present on the charge line 132, the charge state indicator 210 activates. When the power is not present on the charge line 132, the indicator 210 does not activate, but rather remains off.

The subcomponent switches 204a-204g are initially open. When a particular subcomponent switch 204 is closed, connection is made between the subcomponent 202 and the alert signal provided by the data monitoring signal 150 to enable the subcomponent 202. Any combination of the subcomponents 202 may be enabled by closing the associated subcomponent switch 204. A complete circuit is established when the data monitoring signal 150 is high, the subcomponent switch 204 is closed, and there is a common ground connection.

Figure 2A:
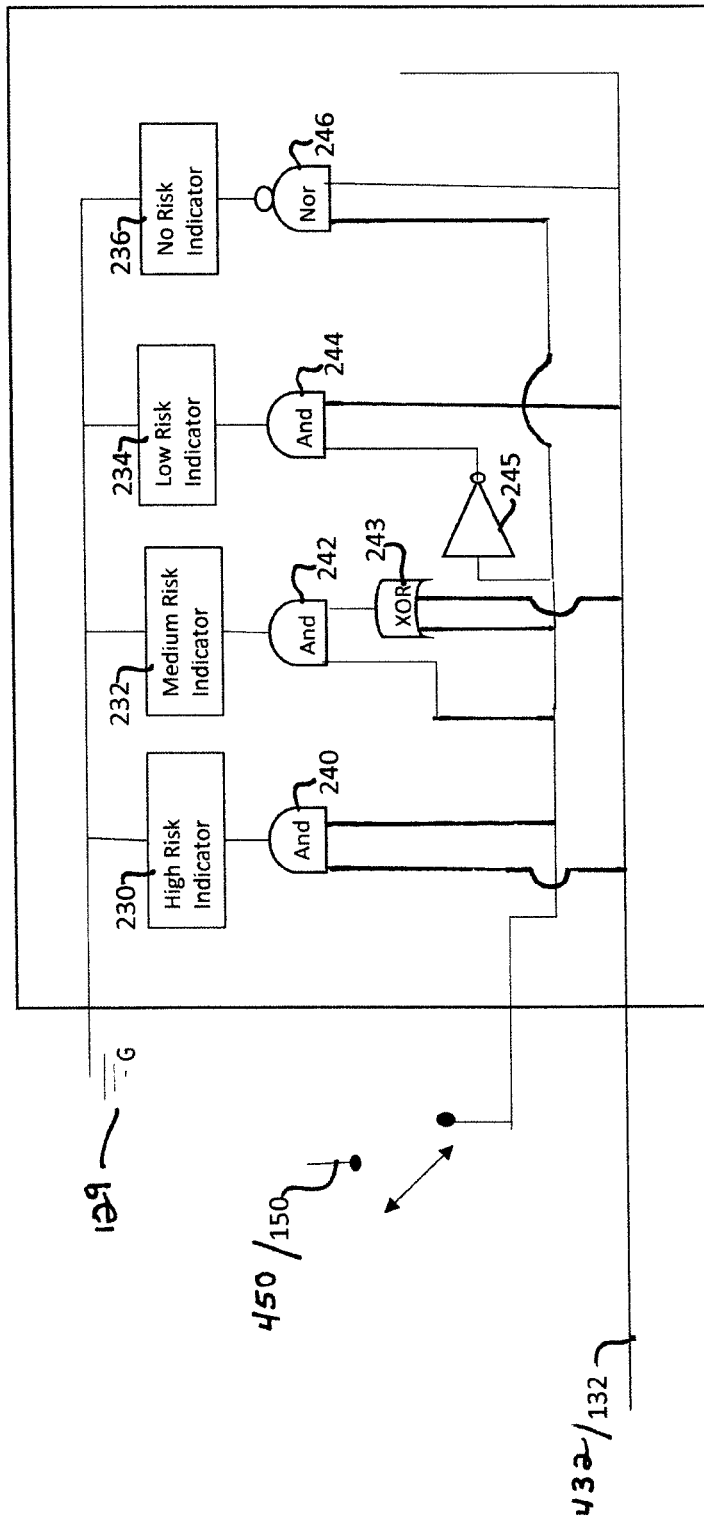
FIG. 2a illustrates an alert output subcomponent of the invention.

Details of the alert subcomponents 202a-202g are illustrated in greater detail in FIG. 2a. As illustrated in FIG. 2a, each alert subcomponent 202a-202g includes four indicators: a high risk indicator 230, a medium risk indicator 232, a low risk indicator 234 and a no risk indicator 236. Each indicator 230-236 includes a logic connection to the data monitoring signal 150 and the charge line 132, and to a common ground connection 129. Upon establishing a connection between the host device 20 and the end user device 60, the charge line 132 is high. When no connection is established between the host device 20 and the end-user device 60, the charge line 132 is low. The high risk indicator 230 takes input from an AND gate 240 that connects to the data monitoring signal 150 and the charge line 132. Thus, the high risk indicator 230 will only activate when the data monitoring signal 150 is high and when the charge line 132 is high. The charge line 132 is high when the end-user device 60, the secure charging device 100, and the host device 20 are connected.

The medium risk indicator 232 takes input from an AND gate 242. The inputs to the AND gate 242 are provided by the data monitoring signal 150 and the output of an XOR gate 243. The inputs to the XOR gate 243 are provided by the data monitoring signal 150 and the charge line 132. When the data monitoring signal 150 is high and the charge line is high, the output of the XOR gate 243 is low and therefore the output of the AND 242 gate is also low. When the data monitoring signal 150 is low and the charge signal 132 is high, the output of the XOR gate 243 is high and therefore the output of the AND gate 242 is low. When the data monitoring signal 150 is low and the charge signal 132 is low, the output of the XOR gate 243 is low and therefore the output of the AND gate 242 is low. When the data monitoring signal 150 is high and the charge signal 132 is low, the output of the XOR gate 243 is high and therefore the output of the AND gate 242 is high. Thus, the medium risk indicator 232 will activate when the data monitoring signal 150 is high and the charge signal 132 is low. This scenario could arise, for example, when an unsuccessful attempt is made to completely disable the USB connector 24. In such a scenario, that charge signal 132 may be successfully disconnected, while the data connection is maintained.

The low risk indicator 234 takes input from an AND gate 244. The inputs to the AND gate 244 are provided by an inverted data monitoring signal provided by inverter 245 and the charge signal 132. When the data monitoring signal 150 is high and the charge line 132 is high, the output of the AND gate 244 is low. When the data monitoring signal 150 is low and the charge signal 132 is high, the output of the AND gate 244 is high. When the data monitoring signal 150 is low and the charge signal 132 is low, the output of the AND gate 244 is low. When the data monitoring signal 150 is high and the charge signal 132 is low, the output of the AND gate 244 is low. Thus, the low risk indicator will activate when there is no data transferred (data monitoring signal is 150 is low or 0 volts) and when charge line 132 is high (5 volts).

The no risk indicator 236 takes input from a NOR gate 246. The inputs to the NOR gate 246 are provided by the data monitoring signal 150 and the charge signal 132. When the data monitoring signal 150 is high and the charge input 132 is high, the output of the NOR gate 246 is low. When the data monitoring signal 150 is low and the charge signal 132 is high, the output of the NOR gate 246 is low. When the data monitoring signal 150 is low and the charge signal 132 is low, the output of the NOR gate 246 is high. When the data monitoring signal 150 is high and the charge signal 132 is low, the output of the NOR gate 246 is low. Thus, the no risk indicator will activate when the data monitoring signal 150 is low and the charge signal 132 is low.

As noted above, each alert subcomponent provides four risk level indicators. The form of the risk level indicators will vary depending upon the particular subcomponent 202a-202g.

In the case of a visual display subcomponent 202a, the risk level indicators 230-236 are provide by four LEDs. The high risk indicator 230 is provided by a red LED; the medium risk indicator 232 is provided by a yellow LED; the low risk indicator 234 is provided by a green LED; and the no risk indicator 236 is provided by a blue LED. As each LED is activated, an observer is provided with a visual indication of the level of risk presented.

In the case of the audio emitter subcomponent 202b, the risk level indicators 230-236 are provided by four audio emitters, each producing a different sound. The sound produced by each audio emitter may differentiated, for example, by decibel level, range, length/duration, pattern, etc. For example, the high risk indicator 230 may emit a pre-defined sound with high decibel level, high range, long length/duration, and steady pattern; the medium risk indicator 232 may emit a pre-defined sound with mid decibel level, medium range, medium length/duration, and medium complex pattern; the low risk indicator 236 may emit a pre-defined sound with low decibel level, low range, low length/duration, and simple pattern; and the no risk indicator may emit no sound or alternatively may emit a very low decibel sound with a very simple pattern.

In the case of the memory register subcomponent 202c, the risk level indicators are provided by four memory registers. Each memory register is assigned a value based on the output of the logic generated from gates 240, 242, 244 and 246. Because the conditions of the signals 150 and 132 allow only one of the memory registers to be assigned a value of "1" at given time, presence of a "1" within a particular memory register provides an indication of the risk level. For example, the high risk indicator 230 is provided by a memory register that is assigned the bit string 1 while the medium, low, and no risk memory registers 232, 234, 236 are assigned 0; the medium risk indicator 232 is provided by a memory register that is assigned the bit string 1 while the high, low, and no risk memory registers 230, 234, 236 are assigned 0; the low risk indicator 234 is provided by a memory register that is assigned the bit string 1 while the high, medium, and no risk memory registers 230, 232 236 are assigned 0; and the no risk indicator 236 is provided by a memory register that is assigned the bit string 1 while the high, medium, and low risk memory registers 230, 232, 234 are assigned 0.

In the case of the logic reader subcomponent 202d, each of four digits displayed by the logic reader is provided by gates 240, 242, 244 and 246 A display of "1000" will indicate a high risk; a display of "0100" will indicate medium risk; a display of "0010" will indicate a low risk; a and display of "0001" will indicate no risk.

In the case of the voltage reader subcomponent 202e, the risk level indicators are provided by four voltage readers each voltage reader is in communication with a gate 240, 242, 244 or 246. Since only one of the gates 240, 242, 244, 246 will produce a logic "1" at a given time, the combination of voltages displayed by the voltage readers will provide an indication of the risk level. A logic "1" is associated with a voltage of approximately 5 volts. A display of voltage sequence "5", "0", "0", "0" indicates a high risk; a display of voltage sequence "0", "5", "0", "0" indicates a medium risk; a display of voltage sequence "0", "0", "5", "0" will indicate a low risk; a and display of voltage sequence "0", "0", "0", "5" will indicate no risk.

In the case of the power meter subcomponent 202f, the risk level indicators are provided by four power meters. Each power meter is in communication with a gate 240, 242, 244 or 246. Since only one of the gates 240, 242, 244, 246 will produce a logic "1" at a given time, the combination of powers displayed by the power meters will provide an indication of the risk level. A logic "1" is associated with a voltage of approximately 5 volts and with a current of 2 mA will provide a reading of 10 mW. When the meter associated with gate 240 displays 10 mW, a high risk level is indicated; when the meter associated with gate 242 displays 10 mW, a medium risk level is indicated; when the meter associated with gate 244 displays 10 mW, a low risk level is indicated; and when the meter associated with gate 246 displays 10 mW, no risk is indicated.

In the case of the resistor subcomponent 202g, the risk level indicators are provided by four resistor. Each resistor may have the same value and is communication with a gate 240, 242, 244 or 246. In this case, a measure of the current passing through each resistor may be displayed. Since only one of the gates 240, 242, 244, 246 will produce a logic "1" at a given time, the combination of displayed currents will provide an indication of the risk level. A current through the resistor associated with gate 240 indicates a high level of risk, a current through the resistor associated with gate 242 indicates a medium level of risk; a current through the resistor associated with gate 244 indicates a low level of risk; and a current through the resistor associated with gate 246 indicates no risk.

Alternatively, the risk level indicator are provided by four resistors, each having a different value. A current is measured through each resistor via an amp reader that is placed in series with the resistors. Since only one of the gates 240, 242, 244, 246 will produce a logic "1" at a given time, the level of current measure will provide an indication as to the level of risks. For example, the highest level amperage measured may provide an indication of the highest risk; a medium level amperage measured may provide an indication of a medium risk; a lower level of amperage measured may provide an indication of a low risk; and when no amperage is measure the no amperage reading may provide an indication of no risk.

As illustrated in FIG. 1, the secure charging device 100 optionally includes a data detection characterizer 300. The data detection characterizer 300, provides a user with information regarding the quantity of data transmission during a charge operation. The data detection characterizer 300 receives the data monitoring signal 150.

Figure 3:
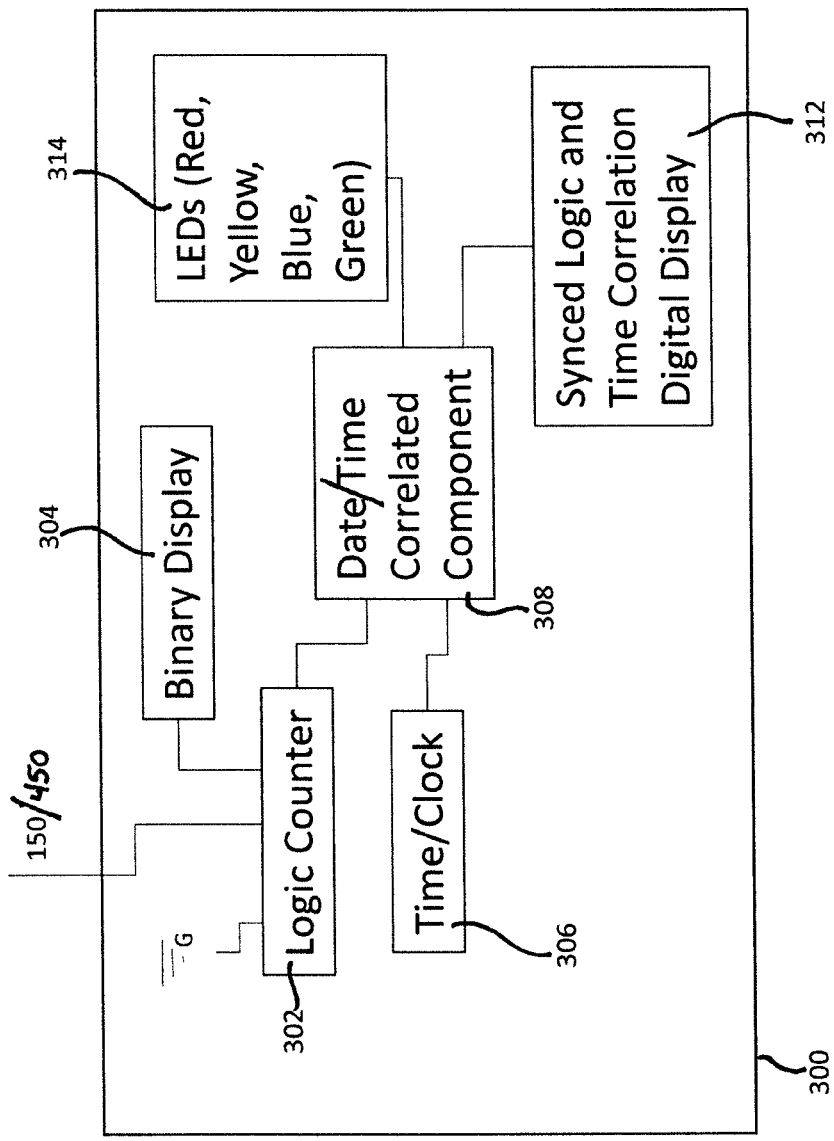
FIG. 3 illustrates an data detection characterizer of the invention.

Details of the data detection characterizer 300 are illustrated in FIG. 3. The data detection characterizer 300 includes a logic counter 302, a binary display 304, a timer/clock 306, synced logic and time correlation digital display 308, data time correlated component 312, and color-coded risk display 314. Because the same data which is passed to the data detection characterizer 300 via the data monitoring signal 150 is also passed to the end user device via the data differential signals 172, 174 provided by the data transmission signal 140, any characterization (e.g., counting and analysis) of the data monitoring signal 150 will also apply to the data transmission signal 140.

The data monitoring signal 150 is received by the logic counter 302. The logic counter 302 is incremented based upon the output provided by the data monitoring signal 150 to provide a calculation of the amount of data that is passed to the data detection characterizer 300. For example, the logic counter 302 may be incremented each time a logic "1" is passed to the data detection characterizer. The logic counter 302 is connected to common ground and to the binary display 304. The binary display 304 displays a binary value representing the total number of bits counted by the logic counter 302. The time frame for the value displayed on the binary display 304 is displayed by the digital display 308. Bits are correlated with respect to time via the data time correlated component 312 that maps bits per second. Component 312 correlates a bit value and a time value associated with the time when the bit was passed. This display 312 may be provided via visual display or via a table of values listing bits passed for time value "t", where "t" may represent seconds, minutes, hours, etc. The color-coded display 314 provides an indication of the amount of data provided by the data monitoring signal 150. For example, the following data ranges may be assigned. When 0B-10B of data are provided by the data monitoring signal 150, the blue LED is illuminated indicating a very low amount of data transferred to the end-user device. When 10B-1 kB of data are provided by the data monitoring signal 150, the green LED is illuminated indicating a low amount of data has been transferred to the end-user device. When 1 kB-100,000 kB of data are provided by the data monitoring signal 150, the yellow LED will illuminate indicating a medium amount of data has been transferred to the end-user device. When more than 100,000 kB of data are provided by the data monitoring signal 150, the red LED will illuminate indicating a high amount of data has been transferred to the end-user device.

Figure 4:
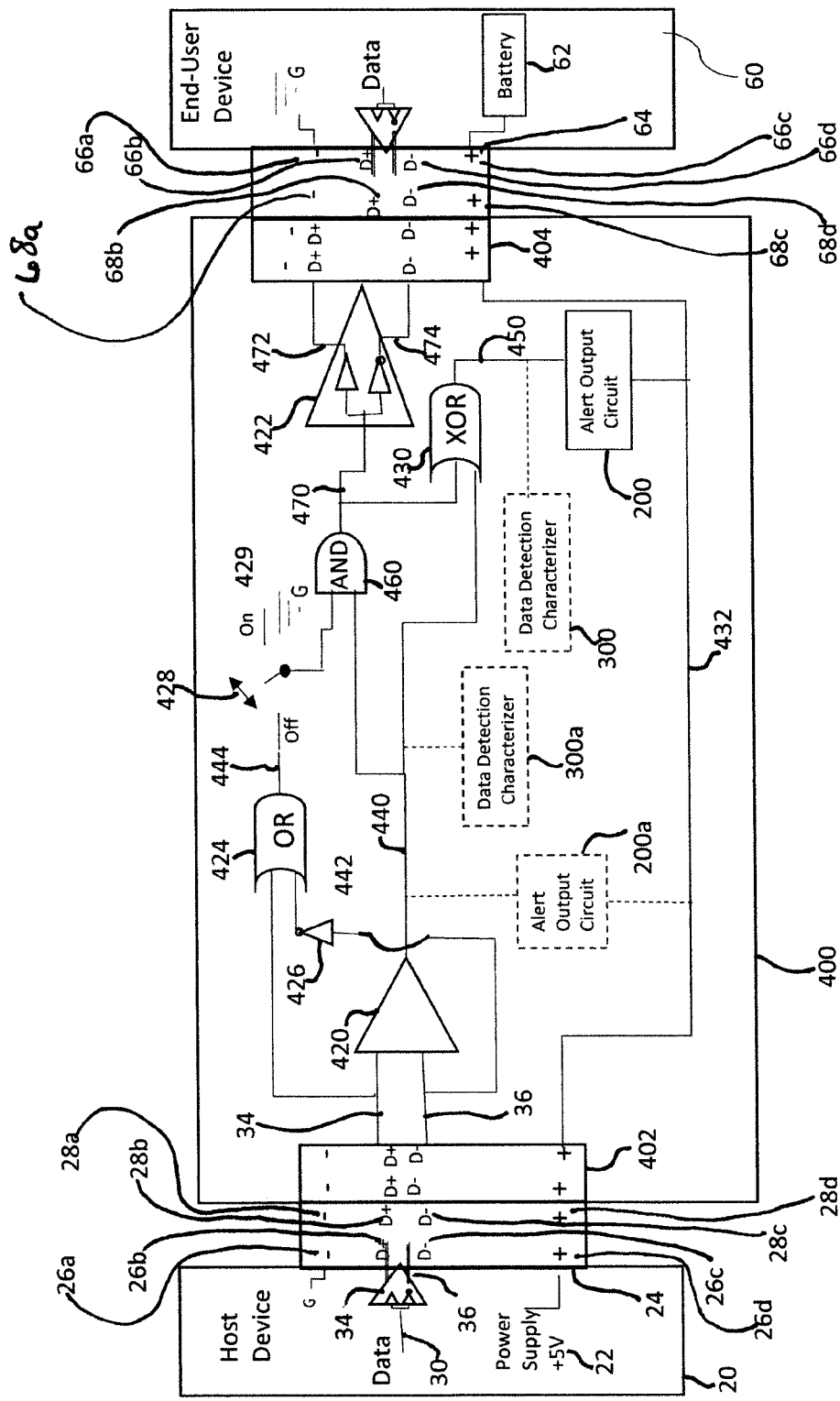
FIG. 4 illustrates a second embodiment of the invention having data termination functionality along with a host device and an end-user device.

A second embodiment 400 of the secure charging device is illustrated in FIG. 4. As illustrated in FIG. 4, the secure charging device 400 includes a host-side connector 402 and an end-user-side connector 404. The secure charging device 400 connects to a host 20 and end-user device 60 in the same manner as the secure charging device 100 as described above. In addition to being able to monitor the data transferred from the host device 20 to the end-user device 60 as provided with the first embodiment 100, this second embodiment 400 provides the ability to terminate the transfer of data to the end-user device 60 while allowing the charge operation to continue.

As illustrated in FIG. 4, the secure charging device 400 includes a subtractor 420, a differential transmitter 422, an OR gate 424, a NOT gate 426, a switch 428, an XOR gate 430, a charge line 432, and an AND gate 460. The secure charging device 400 includes an alert output component 200 and optionally includes a data detection characterizer 300. The secure charging device 400 optionally includes a backup alert output component 200a and a backup data detection characterizer 300a.

The subtractor 420, AND gate 460 and data differential transmitter 422 together provide data transmission logic. As will be described below, in the security disabled mode, the data transmission logic receives the data differential signals 34, 36 from the host device 20 and transmits corresponding data differential signals 472, 474 to the end-user device 60. The subtractor 420 receives positive clone data differential signal (D+) 34 and negative clone data differential signal (D−) 36 from the connector 24 of the host device 20 via connector 402 and generates a data transmission signal 440. If the data input signal provided by the host 20 is high, the output of the subtractor 420 will be high. If the data input signal provided by the host 20 is low, the output of the subtractor 420 will be low. Thus, the data transmission signal 440 of the subtractor follows the data input signal of the host 20. As illustrated, the subtractor output signal 440 is not provided directly to the differential transmitter 422 as provided in connection with the first embodiment of the invention 100. Rather, the subtractor output signal 440 is provided to AND gate 460.

The OR gate 424, the NOT gate 426, the switch 428, the AND gate 460, and the XOR gate 430 together provide data monitoring logic for producing a data monitoring signal 450. Specifically, the positive clone signal (D+) 34 is fed directly to the OR gate 424 and the negative clone signal (D−) 36 is fed thru the NOT gate 426 providing an inverted negative clone signal 442. The OR gate 424 provides OR gate output 444. If the data input signal 30 provided by the host 20 is high, the output signal 444 of the OR gate 424 will be high. If the data input signal provided by the host 20 is low, the output of the OR gate 444 will be low. Thus, the output signal 444 of the OR gate 424 corresponds to the data input signal 30 of the host 20.

The switch 428 provides for selection of either the corresponding data input signal 444 or common ground 429 as an input to the AND gate 460. When the switch 428 is in an OFF position, a first input to the AND gate 460 is provided by the corresponding data input signal 444 and a second input to the AND gate 460 is provided by the data transmission signal 440. When the switch 428 is in an ON position, a first input to the AND gate 460 is provided by the common ground connection 429 and the second input to the AND gate 460 is provided by the data transmission signal 440. The output of the AND gate 460 provides a security disabled data transmission signal 470 as will be discussed below. The differential transmitter 422, receives the security disabled data transmission signal 470 and produces D+ and D− signals 472, 474 to be provided to the connector 64 of the end-user device 60 via the connector 404.

The XOR gate 430 receives the security disabled data signal 470 and the data transmission signal 440 and provides the data monitoring signal 450 as an output.

The charge line 432 of the secure charging device 400 provides for connection of the power supply 22 of the host device 20 to the battery 62 of the end-user device 60 via the connectors 24, 402, 404, 64. The charge line 432 transfers power from the power supply 22 of the host device 20 to the battery 62 of the end user-device 60 to charge the battery 62 of the end-user device 60.

The secure charging device 400 provides two modes of operation. With the switch 428 in the OFF position, the secure charging device 400 is in a security disabled mode. With the switch 428 in the ON position the secure charging device 400 is in a security enabled mode.

In the security disabled mode, charge is passed from the host device 20 to the end user device 60 via the charge line 432. In the security disabled mode, the inputs to the AND gate 460 are provided by the corresponding data input signal 444 and the data transmission signal 440. When the data input provided by the host 20 is high, the data transmission signal 440 is high and the corresponding data input signal 444 is also high. As a result, the security disabled data transmission signal 470 provided by AND gate 460 is high. When data input provided by the host 20 is low, the data transmission signal 440 is low and the corresponding data input signal 444 is also low. Therefore, the security disabled data transmission signal 470 is low. Thus, when security is disabled (i.e. the switch 428 is in an OFF position), the security disabled data transmission signal 470 reflects the data input 30. Further, with the security disabled data transmission signal 470 high and data transmission signal 440 high, the data monitoring signal 450 is low. Continuing with the security disabled mode, when security disabled transmission signal 470 is low and data transmission signal 440 is low, the data monitoring output 450 is low. Thus, regardless of whether the data input from the host 20 is high or low, in the security disabled mode, the data monitoring output 450 is low. When the secure charging device 400 is in the security-disabled mode, the security disabled data transmission will reflect the data input 30 of the host 20 but no data is provided at the data monitoring signal 450. A valid user wishing to conduct authorized data transfers may use the security disabled mode to allow data to flow to the end-user device 60 and no monitoring of the data will be performed. For example, physical access to the switch may be controlled utilizing a lock and key. A valid user may be provided access to the key allowing the valid user to disable the security device 400.

The security-enabled mode is initiated when the switch 428 is set to ON. In the security-enabled mode, charge is passed from the host device 20 to the end user device 60 via the charge line 432. When the switch 428 is set to ON, the inputs to the AND gate 460 are common ground 429 and the data transmission signal 440. Because in this security enabled mode the voltage at 429 will always be zero, regardless of the voltage at 440, the data transmission signal 470 will always be 0 volts. Thus, in this security-enabled mode, the secure charging device 400 terminates the flow of data such that no data is transferred from the host device to the end-user device, i.e. in the security enabled mode, a security disabled data transmission signal 470 is not provided. Although in the security-enabled mode data a signal 470 is not provided, it may be beneficial to monitor operations of the device 400 to determine whether a data input signal 30 is present at the host 20. The data monitoring signal 450 of the XOR gate 430 provides the ability to monitor the presence of data a data input signal 30. The inputs to the XOR gate 430 are the security disabled data transmission signal 470 and data transmission signal 440. As noted above, in the security-enabled mode, the security disabled data transmission signal 470 will always be zero. When the data transmission signal 440 is high, the data monitoring signal 450 is high. When the data transmission signal 440 is low, the data monitoring signal 450 is low. Thus in the security enabled mode, the data monitoring signal 450 reflects the data input 30 of the host 20, during the charge operation.

As illustrated in FIG. 4, the secure charging device 400 includes an alert output component 200. The alert output component 200 is illustrated in greater detail in FIG. 2 and is described above. The alert output component 200 is provided between the XOR output 450 and the charge line 532. When the alert output component 200 receives the data monitoring signal 450 an alert is provided to the observer that the passage of data was attempted between the host device 102 and the end-user device 104.

As illustrated in FIG. 4, the secure charging device 400 optionally includes a data detection characterizer 300. The data detection characterizer 300, provides a user with information regarding the quantity of data attempted for transmission during a charge operation. The data detection characterizer 300 receives the data monitoring signal 450. Details of the data detection characterizer 300 are illustrated in FIG. 3 and are described above.

As further illustrated in FIG. 4, an additional alert output component 200*a* and an additional data detection characterizer 300*a* may be included at the subtractor output 440 to provide a backup alert output component and a backup data detection characterizer. The backup alert output component 200*a* is the same as the alert output component 200 described above and the backup data detection characterizer component 300*a* is the same as the data detection characterizer 300 described above. Positioning the backup alert output component 200 and the backup data detection characterizer 300 at the subtractor output 440 allows for alerts and data characterization regardless of whether the switch 428 is ON or OFF.

Although FIGS. 1 and 4 illustrate the secure charging device as located external to the host device 20, it is to be understood that the secure charging device may be modified for positioning within the host device 20. To position the secure charging device 100/400 within the host device 20 the connector 102/402 is eliminated with the data differential signals 34, 36 provided directly to the subtractor 120/420 and to the OR gate 124/424. Similarly connector 104/404 is eliminated with data differential signals 172/472 and 174/474 applied to the connector 24 of the host device 20. It is to be further understood that the secure charging device may be modified for positioning within the end-user device 60. To position the secure charging device 100/400 within the host device 20 the connector 102/402 is eliminated with the data differential signals 34, 36 provided directly to the subtractor 120/420 and to the OR gate 124/424. In yet another embodiment, the secure charging device may be modified to monitor charging of a component internal to the host device. In such an embodiment the internal component would be considered the end-user device. Another embodiment would include monitoring the connection between the end-user device when the end-user device uses an external charger. In this embodiment the method would check to ensure no data communications take place between the external charger and the end-user device.

While embodiments of the present invention are shown and described, it is envisioned that those skilled in the art may devise various modifications of the present invention without departing from the spirit and scope of the appended claims.

The invention claimed is:

1. A secure charging device for supplying a charge to a battery operated end-user device from a host device, the host device providing data differential signals, the secure charging device comprising:
   a charge line for carrying a charge signal from a power supply of the host device to the battery of the end-user device;
   data transmission logic for receiving the data differential signals from the host device, providing a data transmission signal, and transmitting data differential signals to the end-user device corresponding to the data differential signals received from the host device;
   data monitoring logic providing a security enabled mode of operation and a security disabled mode of operation; wherein when said data monitoring logic is in said security enabled mode of operation, a data monitoring signal is generated by said data monitoring logic; and
   an alert output component in communication with said charge line and receiving said data monitoring signal and wherein said alert output component provides information regarding said data monitoring signal.

2. A secure charging device as defined in claim 1, wherein said alert output component provides a risk level indicator based upon said charge signal and said data monitoring signal.

3. A secure charging device as defined in claim 2, wherein when said voltage on said charge line is high and the voltage provided by said data monitoring signal is high, a high level of risk is indicated.

4. A secure charging device as defined in claim 2, wherein when said voltage on said charge line is low and the voltage provided by said data monitoring signal is high, a medium level of risk is indicated.

5. A secure charging device as defined in claim 2, wherein when said voltage on said charge line is high and the voltage provided by said data monitoring signal is low, a low level of risk is indicated.

6. A secure charging device as defined in claim 2, wherein when said voltage on said charge line is low and the voltage provided by said data monitoring signal is low, a level of risk is indicated as none.

7. A secure charging device as defined in claim 2, wherein risk level is indicated by an LED.

8. A secure charging device as defined in claim 2, wherein risk level indicators are provided by an audio emitter.

9. A secure charging device as defined in claim 1, wherein upon selection of said security enabled mode, said data monitoring signal is provided to a data detection characterizer.

10. A secure charging device as defined in claim 9, wherein said data detection characterizer measures an amount of data provided by said data monitoring signal.

11. A secure charging device as defined in claim 1, wherein said secure charging device is connected to said host device via a USB connection.

12. A secure charging device as defined in claim 1, wherein said secure charging device is connected to said host device via a Ethernet connection.

13. A secure charging device as defined in claim 1, wherein said secure charging device is connected to said host device via a fiber optic connection.

14. A secure charging device as defined in claim 1, wherein said secure charging device is connected to said host device via a wireless connection.

15. A secure charging device as defined in claim 1, wherein in said security enabled mode of operation, said data transmission signal is terminated.

16. A secure charging device as defined in claim 15, further including a back-up alert output component in communication with said data transmission signal and said charge line.

17. A secure charging device as defined in claim 15, further including a back-up data detection characterizer in communication with said data transmission signal and said charge line.

18. A secure charging device for supplying a charge to a battery operated end-user device from a host device, the host device providing data differential signals, the secure charging device comprising:

a charge line for carrying a charge signal from a power supply of the host device to the battery of the end-user device;

data transmission logic for receiving the data differential signals from the host device, providing a data transmission signal, and transmitting data differential signals to the end-user device corresponding to the data differential signals received from the host device;

data monitoring logic providing a security enabled mode of operation and a security disabled mode of operation; wherein when said data monitoring logic is in said security enabled mode of operation, said data transmission signal is terminated; wherein when said data monitoring logic is in said security disabled mode of operation, said data transmission signal is provided to said end-user device; and an alert output component in communication with said charge line and receiving said data monitoring signal and wherein said alert output component provides information regarding said data monitoring signal.

* * * * *